United States Patent [19]

Rutledge, Jr. et al.

[11] Patent Number: 4,919,560
[45] Date of Patent: Apr. 24, 1990

[54] OIL WELL SUCKER ROD

[75] Inventors: Woodrow T. Rutledge, Jr.; Russell P. Rutledge; T. Mike Jones; Don E. McCown; J. Tom Hodnett, all of Big Spring, Tex.

[73] Assignee: Fiberglass Technologies, Inc., Big Spring, Tex.

[21] Appl. No.: 344,673

[22] Filed: Apr. 28, 1989

[51] Int. Cl.⁵ ............................................. F16B 11/00
[52] U.S. Cl. ...................................... 403/268; 403/13; 403/361
[58] Field of Search ................. 403/268, 267, 13, 361, 403/334, 266, 265

[56] References Cited

U.S. PATENT DOCUMENTS

| | | | |
|---|---|---|---|
| Re. 32,865 | 2/1989 | Rutledge, Jr. et al. | 403/268 |
| 2,864,967 | 12/1958 | Redrick et al. | 403/361 X |
| 4,089,612 | 5/1978 | Mazzeo | 403/361 |
| 4,224,786 | 9/1980 | Langlie et al. | 403/361 X |
| 4,401,396 | 8/1983 | McKay . | |
| 4,433,933 | 2/1984 | Parsons, Jr. et al. | 403/268 |
| 4,475,839 | 10/1984 | Strandberg . | |
| 4,653,953 | 3/1987 | Anderson et al. | 403/268 |
| 4,662,774 | 5/1987 | Morrow, Jr. . | |
| 4,666,326 | 5/1987 | Hope . | |
| 4,787,771 | 11/1988 | Allen | 403/267 X |
| 4,822,201 | 4/1989 | Iwasaki et al. | 403/268 |

*Primary Examiner*—Peter M. Cuomo
*Attorney, Agent, or Firm*—H. Dennis Kelly

[57] ABSTRACT

Disclosed is an oil well sucker rod having a fiberglass rod with steel connectors on each end. Each connector has a rod-receiving receptacle having an open end, a closed end, and a plurality of axially spaced annular, tapered surfaces. The taper angles of the tapered surfaces are progresssively less toward the open end of the receptacle. An annular centering surface within the receptacle engages the end of the rod to the center the rod within the connector. A plurality of evenly spaced dimples on the connector extend into the receptacle to the center the rod within the connector at a point spaced from the centering surface.

9 Claims, 1 Drawing Sheet

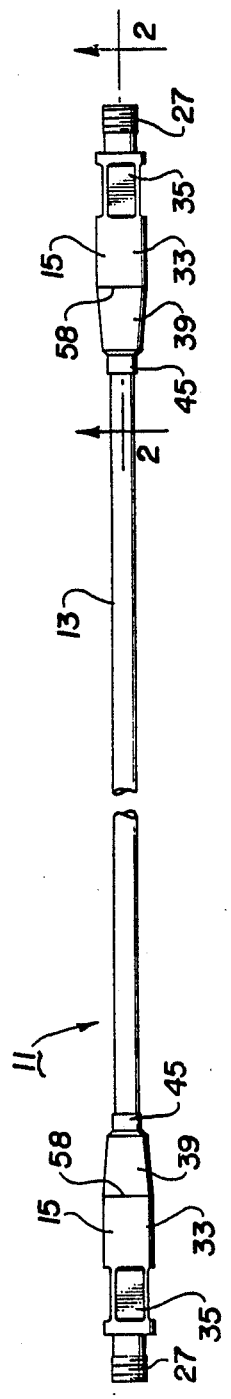
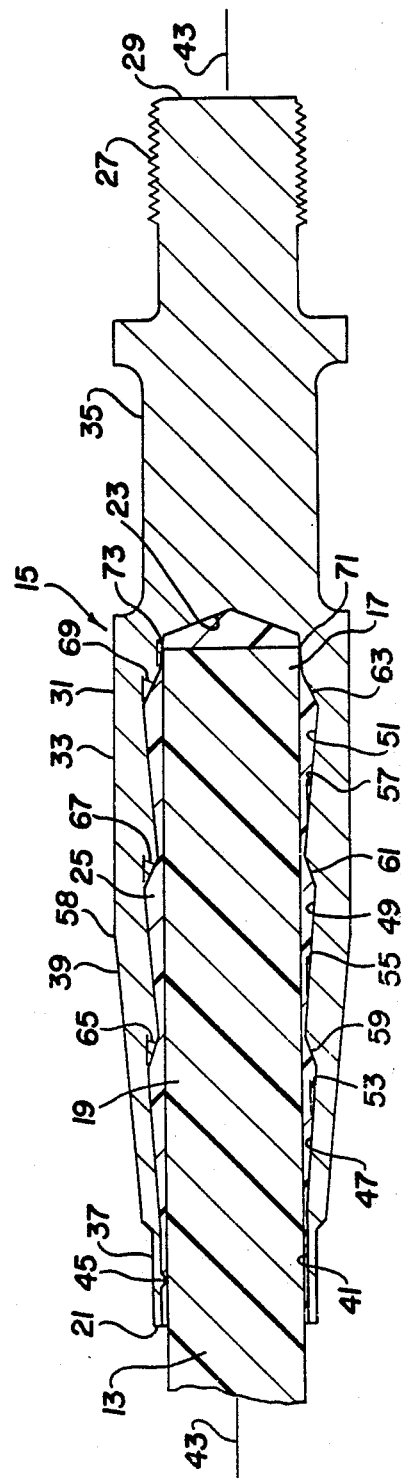
Fig. 1
Fig. 2

OIL WELL SUCKER ROD

BACKGROUND OF THE INVENTION

1. Field of the Invention

This invention relates in general to oil well sucker rods. In particular, the invention relates to oil well sucker rods made of fiberglass with steel connectors on each end.

2. Description of the Prior Art

In many oil wells the pressure in the oil reservoir is insufficient to lift the oil to the surface. In such cases it is conventional to use a sub-surface pump to force the oil out of the well. The sub-surface pump is driven by a pumping unit located at the surface.

The pumping unit is connected to the sub-surface pump by a string of sucker rods. The pumping unit moves the sucker rod string up and down to drive the sub-surface pump.

For many years sucker rods were generally made of steel. Due to the heavy weight of the steel sucker rods, large pumping units were required and pumping depths were limited. It is now preferable to use sucker rods made of fiberglass with steel connectors. Fiberglass rods provide sufficient strength and yet weigh substantially less than steel rods.

Since the invention of the fiberglass sucker rod, efforts have continued to improve the steel connectors between successive rods. For example, U.S. Pat. No. 4,653,953, issued Mar. 31, 1987, to Anderson et al., shows a fiberglass sucker rod having a typical prior art connector.

The connector shown in Anderson et al. has a rod-receiving receptacle and a plurality of axially spaced, annular, tapered surfaces. Bonding material between the rod and the connector holds the rod within the receptacle. The tapered surfaces create increased compressive forces to significantly improve the grip of the bonding agent on the rod. The taper angles of the tapered surfaces are progressively smaller toward the open end of the receptacle.

U.S. Pat. No. 4,401,396, issued Aug. 30, 1983, to McKay, shows another typical sucker rod. The rod is centered within the receptacle of the connector by a centering ring and by the tapered end of the rod. Other sucker rod connectors have used evenly spaced dimples to center the rod within the receptacle.

U.S. Pat. No. Re. 32,865, issued Feb. 14, 1989, to Rutledge, Jr. et al., discloses another typical sucker rod. The outer surface of the connector is generally cylindrical. However, the outer surface of the connector is tapered adjacent to the internal tapered surface nearest the open end of the receptacle.

SUMMARY OF THE INVENTION

The oil well sucker rod of the invention includes an elongated, cylindrical, fiberglass rod, having a steel connector on each end. Each connector has a rod-receiving receptacle having an open end, a closed end, and a plurality of axially spaced, annular, tapered surfaces. The rod is secured within the rod-receiving receptacle by a bonding agent. The taper angles of the tapered surfaces are progressively smaller toward the open end of the receptacle.

An annular, tapered centering surface within the receptacle engages the end of the rod to center the rod within the connector. Near the open end of the receptacle, three evenly spaced dimples extend into the receptacle to center the rod within the receptacle at a point spaced from the centering surface. The rod is thus centered in two places to align the rod with the connector.

DESCRIPTION OF THE DRAWINGS

FIG. 1 is a side view of the apparatus of the invention.

FIG. 2 is a sectional view of the apparatus of the invention as seen along line 2—2 in FIG. 1.

DESCRIPTION OF THE PREFERRED EMBODIMENT

As shown in FIGS. 1 and 2, the sucker rod 11 of the invention has an elongated, cylindrical, fiberglass rod 13. Each rod 13 is approximately thirty-seven feet long. A steel connector 15 is attached to each end 17 of the fiberglass rod 13. Each connector 15 has a rod-receiving receptacle 19 having an open end 21 and a closed end 23. The end 17 of the rod 13 is inserted into the open end 21 of the receptacle 19 and secured with an adhesive bonding material 25.

Each connector 15 has standard external threads 27 on the outer end 29 of the connector 15. A selected number of sucker rods 11 can be connected together with standard box connectors (not shown) to form a sucker rod string long enough to extend from a pumping unit on the surface to a sub-surface pump.

The outer surface 31 of each connector 15 has a large cylindrical section 33. Four flats 35, on the large cylindrical section 33 of the connector 15, allow the connector 15 to be gripped with a sucker rod wrench (not shown).

The outer surface 31 of the connector 15 also has a small cylindrical section 37 adjacent to the open end 21 of the rod-receiving receptacle 19. Between the small cylindrical section 37 and the large cylindrical 33, the outer surface 31 of the connector 15 has a frusto-conical section 39. The frusto-conical section 39 tapers inward from the large cylindrical section 33 to the small cylindrical section 37.

The rod-receiving receptacle 19 has a cylindrical section 41 adjacent to the open end 21. The cylindrical section 41 of the receptacle 19 is parallel to the longitudinal axis 43 of the connector 15. Three indentations or dimples 45 are evenly spaced around the circumference of the cylindrical section 41. The dimples 45 extend into the rod-receiving receptacle 19 to center the rod 13 within the receptacle 19. The dimples are sized to closely fit the outside diameter of the rod 13. If a smaller diameter rod 13 is to be used, the dimples 45 are made longer.

Between the cylindrical section 41 and the closed end 23, the receptacle 19 has three axially spaced, annular, tapered surfaces 47, 49, and 51. The tapered surface 47 closest to the open end 21 of the receptacle 19 has a taper angle 53 of four and one-half degrees. The taper angle is the angle between a tapered surface 47, 49, or 51 and the longitudinal axis 43 of the connector 15. The taper angle 55 of the second tapered surface 49 is five degrees, and the taper angle 57 of the innermost tapered surface 51 is five and one-half degrees. Different taper angles can be used, but the taper angles should be progressively smaller toward the open end 21 of the receptacle 19.

The large cylindrical section 33 of the outer surface 31 of the connector 15 is adjacent to the innermost tapered surface 51 and the frusto-conical section 39 is adjacent to the first and second tapered surfaces 47 and 49. Therefore, the outer surface 31 of the connector 15 is tapered adjacent to the two tapered surfaces 47 and 49 nearest the open end 21 of the rod-receiving receptacle 19. The junction 58 between the large cylindrical section 33 and the frusto-conical section 39 is located radially outward from the second tapered surface 49.

The rod-receiving receptacle 19 has an annular shoulder 59, 61, and 63 at the inner end of each tapered surface 47, 49, and 51, respectively. The taper angles 65, 67, and 69 of the shoulders 59, 61, and 63, that is, the angles between the shoulders 59, 61, and 63 and the longitudinal axis 43 of the connector 15, are progressively smaller toward the open end 21 of the receptacle 19. The taper angle 65 of the first shoulder 59 is twenty-four degrees, the taper angle 67 of the second shoulder 61 is twenty-seven degrees, and the taper angle 69 of the third shoulder 63 is thirty-two degrees.

The closed end 23 of the rod-receiving receptacle 19 is a conical surface as a result of the drilling of the receptacle 19. An annular, tapered centering surface 71 is located between the third shoulder 63 and the conical closed end 23 of the receptacle 19. The taper angle 73 of the centering surface 65, that is, the angle between the centering surface 65 and the longitudinal axis 43 of the connector 15, is smaller than the taper angle 57 of the third shoulder 63. The preferred taper angle 67 of the centering surface 65 is nine degrees.

The circumference of the end of the rod 13 engages the centering surface 71 when the rod 13 is inserted into the rod-receiving receptacle 19. The taper angle 73 of the centering surface 71 causes the end of the rod 13 to move toward the center of the receptacle 19 as the rod 13 enters the receptacle 19. The connector 15 can be used with any rod 13 having a diameter within a certain range, because the centering surface 71 will accommodate a range of diameters. A rod 13 having a smaller diameter will simply move farther into the receptacle 19 and engage the centering surface 71 at a different point.

The centering surface 71 centers the end of the rod 13 axially within the connector 15. The dimples 45 center the rod 13 within the receptacle 19 at a point spaced from the centering surface 71. Centering the rod 13 in two spaced apart locations causes the rod 13 to be aligned along the longitudinal axis 43 of the connector 15.

The apparatus of the invention has several advantages over the prior art. The dimples 45 and the centering surface 71 simply and accurately center and align the rod 13 within the connector 15. Also, the centering surface 71 will accommodate any rod 13 having a diameter within a certain range.

The invention has been shown in only one of its embodiments. It should be apparent to those skilled in the art that the invention is not so limited, but is susceptible to various changes and modifications without departing from the spirit of the invention.

We claim:

1. An oil well sucker rod, comprising:
an elongated, cylindrical rod;
a connector attached to one end of the rod for connecting the rod to another rod and having a rod-receiving receptacle, the receptacle having an open end, a closed end, and a plurality of axially spaced, annular, tapered surfaces;
an annular, tapered centering surface within the receptacle in engagement with the end of the rod for centering the rod axially within the connector;
a plurality of dimples on the connector extending into the receptacle to contact the rod for centering the rod within the connector at a point spaced from the centering surface; and
an adhesive bonding material within the receptacle for securing the connector to the rod.

2. An apparatus as defined in claim 1 wherein each tapered surface has a different taper angle.

3. An apparatus as defined in claim 2 wherein the taper angles of the tapered surfaces are progressively smaller toward the open end of the receptacle.

4. An apparatus as defined in claim 3 wherein the taper angles of the tapered surfaces decrease by one-half degree from one tapered surface to the next progressively toward the open end of the receptacle.

5. An apparatus as defined in claim 4 wherein the taper angles of the tapered surfaces are five and one-half degrees, five degrees, and four and one-half degrees progressively toward the open end of the receptacle.

6. An apparatus as defined in claim 1 wherein the centering surface has a taper angle of nine degrees.

7. An apparatus as defined in claim 1 wherein the centering surface of the receptacle engages the circumference of the end of the rod.

8. An oil well sucker rod, comprising:
an elongated, cylindrical rod;
a connector attached to one end of the rod for connecting the rod to another rod, the connector having an outer surface which has a generally cylindrical section and a frusto-conical section and the connector having a rod-receiving receptacle, the receptacle having an open end, a closed end, and at least three axially spaced, annular, tapered surfaces, including first and second tapered surfaces nearest to the open end of the receptacle, the first and second tapered surfaces being adjacent to the frusto-conical section of the outer surface of the connector and the other tapered surfaces being adjacent to the generally cylindrical section of the outer surface of the connector;
an annular, tapered centering surface within the receptacle in engagement with the end of the rod for centering the rod axially within the connector;
a plurality of dimples on the connector extending into the receptacle to contact the rod for centering the rod within the connector at a point spaced from the centering surface; and
an adhesive bonding material within the receptacle for securing the connector to the rod.

9. An oil well sucker rod, comprising:
an elongated, cylindrical rod;
a connector attached to one end of the rod for connecting the rod to another rod, the connector having an outer surface which as a generally cylindrical section, a frusto-conical section, and a junction between the generally cylindrical section and the frusto-conical section, and the connector having a rod-receiving receptacle, the receptacle having an open end, a closed end, and at least three axially spaced, annular, tapered surfaces, including first and second tapered surfaces nearest to the open end of the receptacle, the junction between the generally cylindrical section and the frusto-conical section being located radially outwards from the second tapered surface;
an annular, tapered centering surface within the receptacle in engagement with the end of the rod for centering the rod axially within the connector;
a plurality of dimples on the connector extending into the receptacle to contact the rod for centering the rod within the connector at a point spaced from the centering surface; and
an adhesive bonding material within the receptacle for securing the connector to the rod.

* * * * *